United States Patent [19]
Hilditch

[11] Patent Number: 5,737,752
[45] Date of Patent: Apr. 7, 1998

[54] CACHE REPLACEMENT MECHANISM

[75] Inventor: Albert Stephen Hilditch, Wokingham, England

[73] Assignee: International Computers Limited, Putney, England

[21] Appl. No.: 670,238

[22] Filed: Jun. 17, 1996

Related U.S. Application Data

[63] Continuation of Ser. No. 216,253, Mar. 22, 1994, abandoned.

[30] Foreign Application Priority Data

Apr. 8, 1993 [GB] United Kingdom ............... 9307359

[51] Int. Cl.⁶ .................................................. G06F 12/12
[52] U.S. Cl. .................... 711/133; 711/117; 711/118; 711/128; 711/134; 711/135; 711/136; 711/144; 711/154; 711/158; 711/159; 711/160
[58] Field of Search ........................ 395/445, 460, 395/461, 462, 463, 471, 485, 486, 487, 444, 455; 711/133, 117, 118, 128, 134, 135, 136, 144, 154, 158, 159, 160

[56] References Cited

U.S. PATENT DOCUMENTS

| | | | |
|---|---|---|---|
| 3,949,369 | 4/1976 | Churchill, Jr. | 340/172.5 |
| 4,084,230 | 4/1978 | Matick | 364/200 |
| 4,463,420 | 7/1984 | Fletcher | 364/200 |
| 4,658,351 | 4/1987 | Teng | 364/200 |
| 4,829,425 | 5/1989 | Bain, Jr. et al. | 364/200 |
| 4,833,642 | 5/1989 | Ooi | 365/49 |
| 4,972,338 | 11/1990 | Crawford et al. | 364/200 |
| 5,287,508 | 2/1994 | Hejna, Jr. et al. | 395/650 |
| 5,394,531 | 2/1995 | Smith | 395/425 |
| 5,428,789 | 6/1995 | Waldron, III | 395/700 |
| 5,448,731 | 9/1995 | Wang et al. | 395/650 |
| 5,487,162 | 1/1996 | Tanaka et al. | 395/472 |
| 5,488,709 | 1/1996 | Char | 395/445 |
| 5,555,393 | 9/1996 | Tanaka et al. | 395/460 |

FOREIGN PATENT DOCUMENTS 0 391 871  10/1990  European Pat. Off. .

*Primary Examiner*—Gopal C. Ray
*Assistant Examiner*—Valerie Darbe
*Attorney, Agent, or Firm*—Lee, Mann, Smith, McWilliams, Sweeney & Ohlson

[57] ABSTRACT

An n-way set-associative cache (where n is an integer greater than 1), includes a replacement mechanism for selecting a cache line for replacement. Each cache line has an associated priority tag indicating a user-defined priority for that cache line The replacement mechanism comprises an apparatus for selecting a cache line with the lowest user-defined priority in a current set of cache lines, and apparatus (e.g. based on recency of usage) for choosing between cache lines of equal priority if there is more than one cache line with said lowest user-defined priority in the current set.

4 Claims, 3 Drawing Sheets

CACHE REPLACEMENT MECHANISM

This application is a continuation of application Ser. No. 216,253, filed Mar. 22, 1994, now abandoned.

BACKGROUND TO THE INVENTION

This invention relates to set-associative cache memories.

In computer systems, it is well known to employ one or more cache memories of various sizes. The aim is to keep the most useful data in a small, fast cache in order to avoid having to retrieve the data from the larger, slower RAM. It is common to design levels of caching of different sizes and speeds.

If the required data is in a cache, it is said that a "hit" has occurred, otherwise a "miss" has occurred. The percentage of misses is called the "miss rate".

Apart from the cache size, there are two major design decisions when implementing a cache:

(1) The number of cache elements scanned simultaneously, sometimes called the "set associativity" of the cache. If just one element at a time is scanned, the cache is referred to as direct mapped. If n elements at a time are scanned (where n is greater than 1) the cache is referred to as an n-way set-associative cache. The usual choice for the value of n is 2 or 4. If all the cache is scanned simultaneously, it is referred to as fully associative. The miss rates decrease, in general, as the set associativity increases. However, the cost of implementation increases as set associativity increases.

(2) The method used to decide which cache element scanned within the cache to replace with the desired data on a cache miss, called the cache replacement policy. This has no meaning for a direct-mapped cache since there is only one place to put the desired data. The two standard replacement methods used are: "random replacement", when the desired data is placed in one of the scanned cache elements at random, and "least recently used (LRU) replacement", when the scanned element which has been accessed least recently is replaced by the desired data. LRU replacement usually delivers the smallest miss rate but is more expensive to implement.

The object of the present invention is to provide a new cache replacement mechanism, which is potentially more efficient than these known replacement mechanisms.

SUMMARY OF THE INVENTION

According to the invention there is provided an n-way set-associative cache (where n is an integer greater than 1), including a replacement mechanism for selecting a cache line for replacement, characterised in that each cache line has an associated priority tag indicating a user-defined priority for that cache line, and the replacement mechanism comprises means for selecting a cache line with the lowest user-defined priority in a current set of cache lines, and means for choosing between cache lines of equal priority if there is more than one cache line with said lowest user-defined priority in said set.

The invention thus provides a priority replacement policy (PRP), which replaces data in cache lines primarily according to user-defined priorities and secondarily according to an alternative replacement policy. The alternative replacement policy is used to choose between the data in two cache lines that have the same user-defined priority. The alternative replacement policy is said to resolve the replacement choice between the equal priority data within the currently addressed cache lines. This alternative replacement policy may, for example, be a least-recently-used replacement policy, or a random selection.

This invention enables the data or instructions associated with a given process, application, user or user group to have relative priority within the cache. The highest priority data or instructions stay in the cache for as long as possible.

DESCRIPTION OF AN EMBODIMENT OF THE INVENTION

One cache system in accordance with the invention will now be described by way of example with reference to the accompanying drawings.

Figure 1:
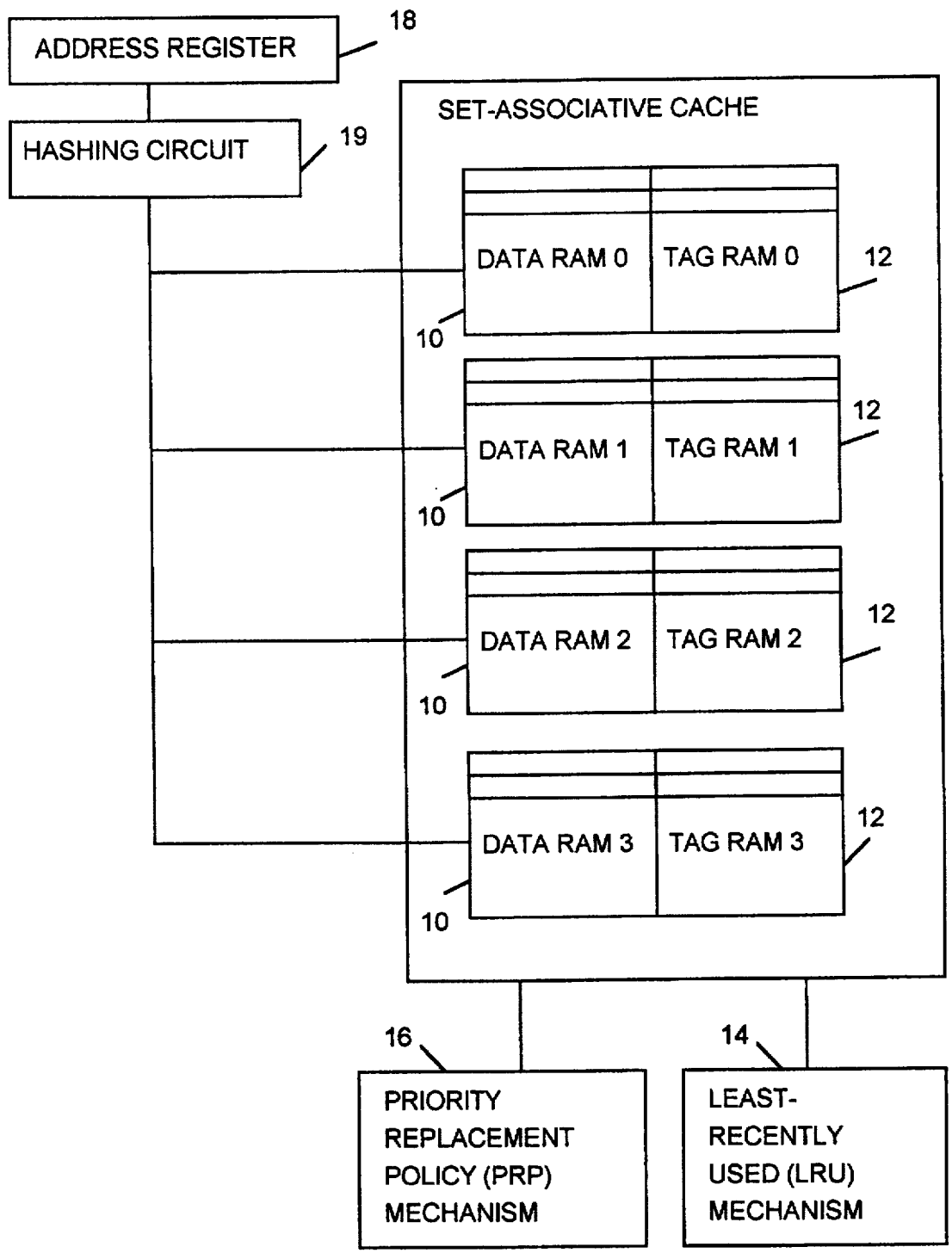
FIG. 1 shows a cache system with priority tags.

Referring to FIG. 1, the cache system comprises a 4-way set associative cache comprising four cache data RAMs 10 and four priority tag RAMs 12. The tag RAMs contain a user-defined priority tag for each line of data in the cache. The priority may be defined explicitly, or inherited implicitly from the data's process, application, user or user's group.

The cache system also comprises a least-recently-used (LRU) replacement mechanism 14 and a priority replacement policy (PRP) mechanism 16. The LRU mechanism keeps recency of usage information relating to each cache line, and may be conventional. The operation of the PRP mechanism will be described below.

An input memory address is received in an address register 18. This address is hashed by a hashing circuit 19 and then applied in parallel to the four cache data RAMs, so as to address one line from each RAM. The contents of the four addressed cache lines are examined to see if the desired data is resident in the cache.

Figure 2:
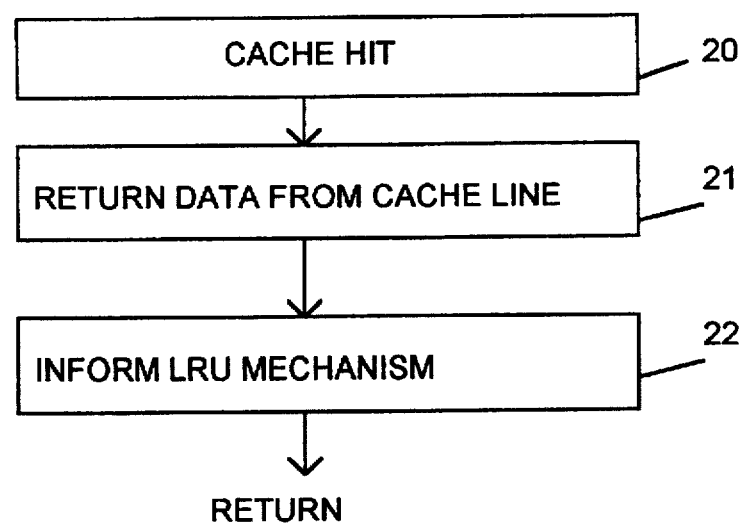
FIG. 2 is a flow chart indicating the operation of the cache system on a cache hit.

Referring to FIG. 2, if one of the addressed cache lines contains the desired data, then there is a hit (20) and the desired data can be immediately accessed (21) from the cache. The LRU mechanism 14 is informed (22) so that it can update the recency-of-usage information for that cache line.

Figure 3:
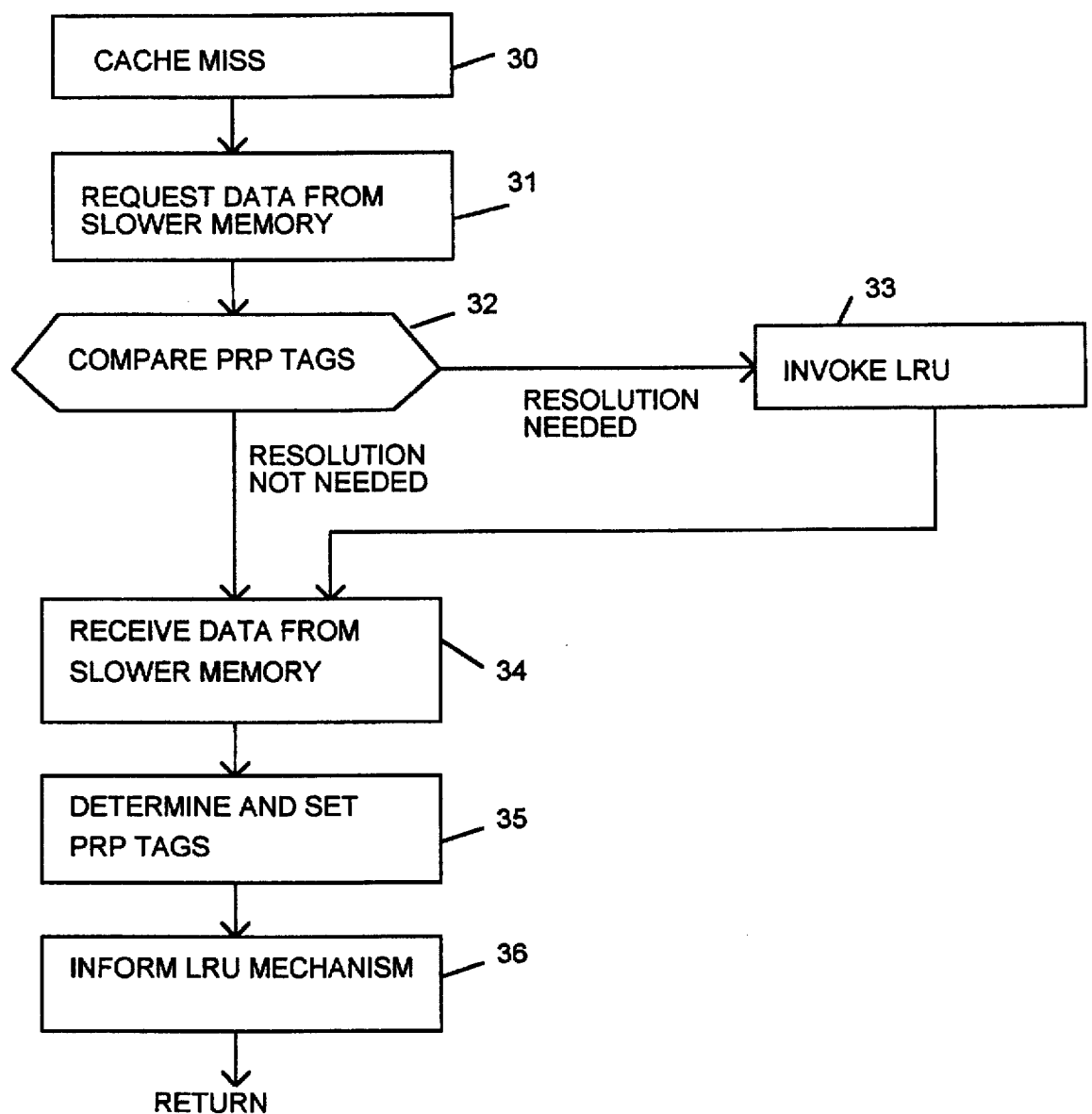
FIG. 3 is a flow chart indicating the operation of the cache system on a cache miss.

Referring to FIG. 3, if there is a cache miss (30) the desired data is requested (31) from slower memory. The PRP mechanism 16 then compares (32) the priority tags associated with the four addressed cache lines, to determine which of the four addressed cache lines is of lowest priority. If only one of the four addressed cache lines has this lowest priority, that line is chosen to receive the desired data from the slower memory. If on the other hand more than one data line has this lowest priority, the LRU mechanism 14 is invoked (33) to resolve the replacement choice.

When the required data is received (34) from slower memory it is written into the cache line selected for replacement. The value of the priority tag of the data is then determined (35), for example from the priority of its process, stored in a process block. This priority tag is written into the corresponding location of the priority tag RAM 12. The LRU mechanism is then informed (36) of the identity of the cache line into which the new data has been written, so that the LRU mechanism can update the recency-of-usage information for that line.

I claim:

1. An n-way set-associative cache (where n is an integer greater than 1), comprising:
   (a) a plurality n of cache RAMs, each of said cache RAMs containing a plurality of cache lines;
   (b) means for storing a plurality of priority tags, one for each of said cache lines, said priority tags defining respective individual user-defined priorities for each of said cache lines;
   (c) addressing means for addressing said cache RAMs in parallel to select a set of n cache lines, one line from each of the cache RAMs;
   (d) means for comparing the priority tags of said set of n cache lines with each other;
   (e) first selection means operative in the event that one of said set of n cache lines has a priority, as defined by its priority tag, that is lower than the priorities of all others of said set of n cache lines, as defined by their priority tags, for selecting said one of said set of n cache lines for replacement; and
   (f) second selection means operative in the event that at least two of said set of n cache lines have priorities, as defined by their priority tags, that are equal to each other but lower than the priorities of all others of said set of n cache lines, as defined by their priority tags, for selecting one of said at least two of said set of n cache lines for replacement.

2. An n-way set-associative cache according to claim 1 wherein said second selection means comprises means for selecting a least-recently used one of said at least two of said n cache lines for replacement.

3. A method of operating an n-way set-associative cache (where n is an integer greater than 1), said cache comprising a plurality n of cache RAMs, each of said cache RAMs containing a plurality of cache lines, the method comprising:
   (a) storing a plurality of priority tags, one for each of said cache lines, said priority tags defining respective individual user-defined priorities for each of said cache lines;
   (b) addressing said cache RAMs in parallel to select a set of n cache lines, one line from each of the cache RAMs;
   (c) comparing the priority tags of said set of n cache lines with each other;
   (d) in the event that one of said set of n cache lines has a priority, as defined by its priority tag, that is lower than the priorities of all others of said set of n cache lines, as defined by their priority tags, selecting said one of said set of n cache lines for replacement; and
   (e) in the event that at least two of said set of n cache lines have priorities, as defined by their priority tags, that are equal to each other but lower than the priorities of all others of said set of n cache lines, as defined by their priority tags, selecting one of said at least two of said set of n cache lines for replacement.

4. A method according to claim 3 wherein said step of selecting one of said at least two of said n cache lines for replacement comprises selecting a least-recently-used one of said at least two of said n cache lines for replacement.

* * * * *